(12) United States Patent
Itou (10) Patent No.: US 9,638,330 B2
(45) Date of Patent: May 2, 2017

(54) ULTRAHIGH-PRESSURE SEALING DEVICE AND RECIPROCATING PUMP

(71) Applicant: SUGINO MACHINE LIMITED, Uozu, Toyama Prefecture (JP)

(72) Inventor: Kouichi Itou, Toyama (JP)

(73) Assignee: SUGINO MACHINE LIMITED, Uozu, Toyama Prefecture (JP)

( * ) Notice: Subject to any disclaimer, the term of this patent is extended or adjusted under 35 U.S.C. 154(b) by 0 days.

(21) Appl. No.: 15/184,489

(22) Filed: Jun. 16, 2016

(65) Prior Publication Data
US 2017/0023135 A1    Jan. 26, 2017

(30) Foreign Application Priority Data

Jul. 23, 2015  (JP) ................................ 2015-145894

(51) Int. Cl.
*F16J 15/16* (2006.01)
*F16J 15/34* (2006.01)
(Continued)

(52) U.S. Cl.
CPC ............ *F16J 15/344* (2013.01); *F04B 53/14* (2013.01); *F16J 15/38* (2013.01)

(58) Field of Classification Search
CPC ........ F16J 15/18; F16J 15/181; F16J 15/3436; F16J 15/344; F16J 15/38; F16J 15/44; F04B 53/14
See application file for complete search history.

(56) References Cited

U.S. PATENT DOCUMENTS 3,218,087 A    11/1965  Hallesy
5,092,609 A *  3/1992  Balzano ............... F04B 53/164
                                                  277/589
(Continued)

FOREIGN PATENT DOCUMENTS

JP        01203764 A  *  8/1989
JP     H01-203764 A      8/1989
(Continued)

OTHER PUBLICATIONS

Extended European Search Report mailed on Nov. 30, 2016 from European Patent Office for an corresponding European patent application No. 16175507.9.

*Primary Examiner* — Gilbert Lee
(74) *Attorney, Agent, or Firm* — United IP Counselors, LLC (57) ABSTRACT

An ultrahigh-pressure sealing device improves sealing performance under ultrahigh pressures and improves durability. The ultrahigh-pressure sealing device is arranged to seal an annular space between an outer member and an inner member and separates between a high-pressure chamber and a low-pressure chamber. A bottom ring includes a first inner periphery, a first large-diameter outer periphery, a first small-diameter outer periphery, and a first middle outer periphery. A back-up ring includes a second inner periphery, a second engagement portion, and a second outer periphery. A packing ring includes a third low-pressure-chamber end, a third inner periphery, a third large-diameter outer periphery, a third the small-diameter outer periphery, and a third middle outer periphery. An elastic ring includes a fourth inner periphery, a fourth the engagement portion, and a fourth outer periphery.

18 Claims, 7 Drawing Sheets

(51) Int. Cl.
*F04B 53/14* (2006.01)
*F16J 15/38* (2006.01)

(56) References Cited

U.S. PATENT DOCUMENTS

| | | | | |
|---|---|---|---|---|
| 2004/0084851 A1* | 5/2004 | Lugovskoy | .............. | F16J 15/56 277/500 |
| 2007/0252340 A1* | 11/2007 | Karl | ......................... | F16J 15/28 277/534 |

FOREIGN PATENT DOCUMENTS

| | | |
|---|---|---|
| JP | H11-051193 A | 2/1999 |
| JP | 2003-065439 A | 3/2003 |

\* cited by examiner

ULTRAHIGH-PRESSURE SEALING DEVICE AND RECIPROCATING PUMP

CROSS-REFERENCE TO RELATED APPLICATIONS

This application claims the benefit of priority to Japanese Patent Application No. 2015-145894, filed on Jul. 23, 2015, the entire contents of which are hereby incorporated by reference.

BACKGROUND

1. Technical Field

The present invention relates to an ultrahigh-pressure sealing device and a reciprocating pump.

2. Description of the Background

High-pressure pumps operating at 400 MPa known in the art may incorporate a sealing device including a bottom ring, a back-up ring, a packing, and an elastic ring arranged in this order in the axial direction from a low-pressure chamber toward a high-pressure chamber (refer to, for example, Japanese Unexamined Patent Application Publication Nos. 1-203764, 11-51193, and 2003-65439, or Patent Literatures 1, 2, and 3).

A sealing device in such a high-pressure pump includes a bottom ring formed from high-strength stainless steel to slide on an inner member (plunger), and includes a back-up ring and an elastic ring to seal with an outer member (cylinder).

BRIEF SUMMARY

The sealing device known in the art can easily have poor sealing of its back-up ring when the outer member significantly increases its inner diameter under pressures of 500 MPa or higher. Under such pressures, the sealing member can undergo sliding while deformed, and thus can easily have uneven wear, which shortens the lifetime of the seal.

One or more aspects of the present invention are directed to an ultrahigh-pressure sealing device and a reciprocating pump that improve sealing performance under ultrahigh pressures and improve durability.

An ultrahigh-pressure sealing device mountable in an annular space between an outer member and an inner member to seal the annular space and to separate between a high-pressure chamber and a low-pressure chamber, the sealing device comprising:

a bottom ring including a first low-pressure-chamber end nearer the low-pressure chamber, and a first high-pressure-chamber end nearer the high-pressure chamber, a first inner periphery coming in contact with the inner member, a first large-diameter outer periphery connecting to the first low-pressure-chamber end, and coming in contact with the outer member, a first small-diameter outer periphery having a smaller diameter than the first large-diameter outer periphery, and connecting to the first high-pressure-chamber end, a first middle outer periphery connecting the first large-diameter outer periphery and the first small-diameter outer periphery;

a back-up ring including a second high-pressure-chamber end nearer the high-pressure chamber, a second inner periphery mounted on the first small-diameter outer periphery and in contact with the first small-diameter outer periphery, a second engagement portion engaged with the first middle outer periphery to restrict movement in an axial direction, a second outer periphery coming in contact with the outer member;

a packing ring including a third low-pressure-chamber end nearer the low-pressure chamber, and in contact with the second high-pressure-chamber end, a third high-pressure-chamber end nearer the high-pressure chamber, a third inner periphery coming in contact with the inner member, a third large-diameter outer periphery connecting to the third low-pressure-chamber end, and coming in contact with the outer member, a third small-diameter outer periphery having a smaller diameter than the third large-diameter outer periphery, and connecting to the third high-pressure-chamber end, a third middle outer periphery connecting the third large-diameter outer periphery and the third small-diameter outer periphery; and an elastic ring including a fourth inner periphery mounted on the third small-diameter outer periphery and in contact with the third small-diameter outer periphery, a fourth engagement portion engaged with the third middle outer periphery to restrict movement in the axial direction, and a fourth outer periphery coming in contact with the outer member.

Although not limited to specific values, the ultrahigh pressure typically refers to pressures of 300 MPa or higher. In some embodiments, the ultrahigh pressure is in a range of 300 to 700 MPa, or in a range of 500 to 700 MPa.

The ultrahigh-pressure sealing device according to one or more embodiments of the present invention improves sealing performance under ultrahigh pressures, and improves durability. The ultrahigh-pressure sealing device is thus usable in reciprocating pumps operable under ultrahigh pressures (500 to 700 MPa).

DETAILED DESCRIPTION

An ultrahigh-pressure sealing device and a reciprocating pump according to one or more embodiments will now be described with reference to FIGS. 1 to 3.

Ultrahigh-Pressure Sealing Device

Figure 1:
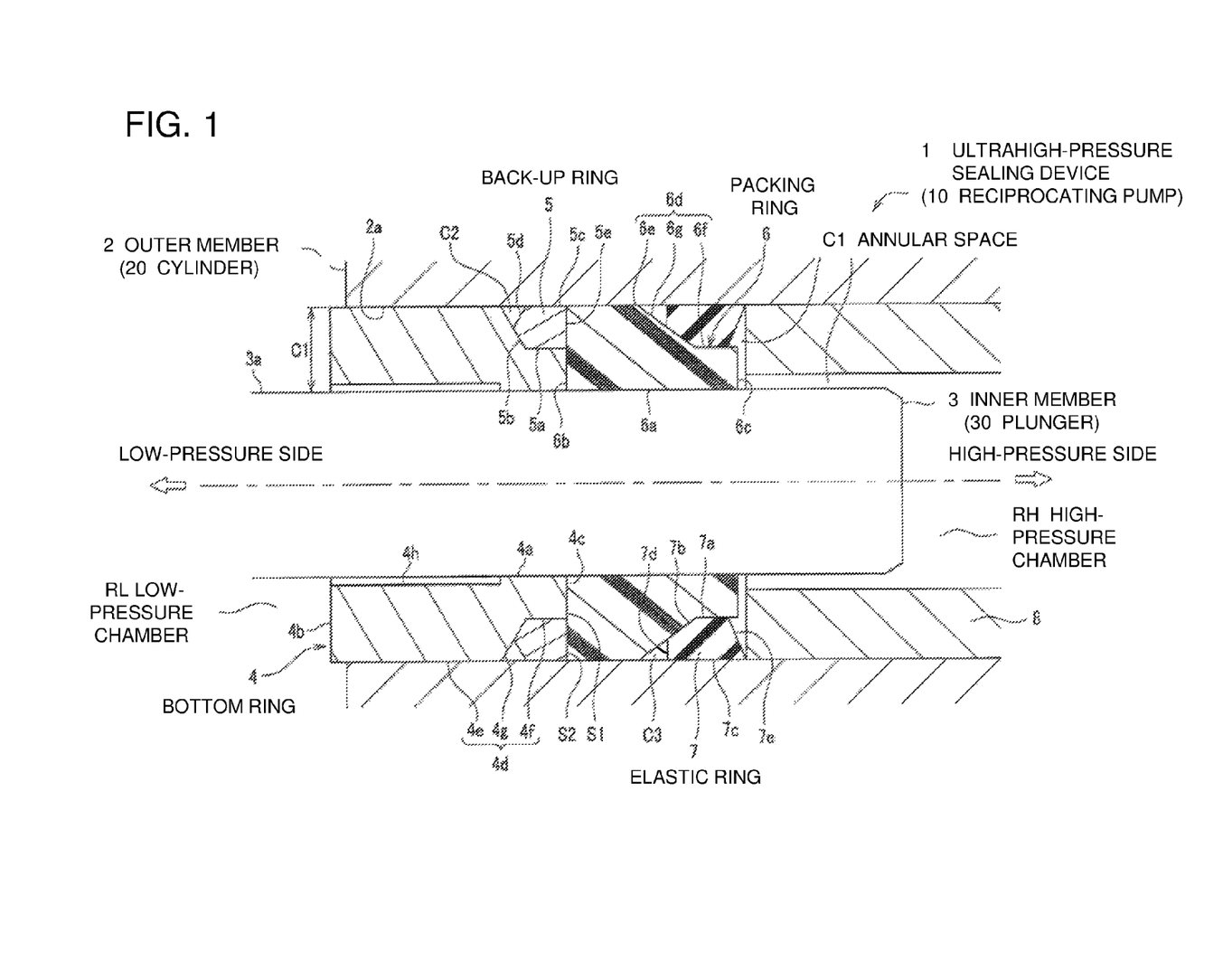
FIG. 1 is a schematic cross-sectional view showing the main components of an ultrahigh-pressure sealing device according to one or more embodiments.

As shown in FIG. 1, the ultrahigh-pressure sealing device 1 seals fluid at extremely high pressures to prevent leakage. The ultrahigh-pressure sealing device 1 can be used in fluid couplings including valves and swivel joints, pumps including reciprocating pumps and high-pressure plunger pumps, and high-pressure generators for pressuring fluid. The ultrahigh-pressure sealing device 1 can seal fluid under pressures of 500 MPa and higher. The ultrahigh-pressure sealing device 1 is mounted in an annular space C1 defined between an outer member 2 and an inner member 3 to seal the annular space C1 and separate between a high-pressure chamber RH and a low-pressure chamber RL. In one or more embodiments described below, the ultrahigh-pressure sealing device 1 is used as, for example, a sealing unit in a reciprocating pump 10 (plunger pump). The outer member 2 is a cylinder 20, which is a pressure vessel. The inner member 3 is a plunger 30, which reciprocates inside the cylinder 20.

The ultrahigh-pressure sealing device 1 includes a bottom ring 4, a back-up ring 5, a packing ring 6, an elastic ring 7, and a spacer ring 8. The bottom ring 4 is mounted on an outer periphery of the plunger 30 on the side of the low-pressure chamber RL. The back-up ring 5 is mounted on a small-diameter outer periphery 4*f* and a middle outer periphery 4*g* of the bottom ring 4. The packing ring 6 is mounted adjacent to the high-pressure chamber RH side of the bottom ring 4 on the outer peripheral surface of the plunger 30. The elastic ring 7 is mounted on a small-diameter outer periphery 6*f* and a middle outer periphery 6*g* of the packing ring 6. The spacer ring 8 is loosely mounted around the outer periphery of the plunger 30 on the side of the high-pressure chamber RH.

Outer Member

As shown in FIG. 1, the outer member 2 is a pressure vessel, such as the cylinder 20. The outer member 2 is a cylindrical member with a cylinder chamber 2*a*, in which the inner member 3 can reciprocate. The outer member 2 is placed in a housing (not shown).

Inner Member

The inner member 3 is the plunger 30 (piston), which reciprocates with, for example, hydraulic pressure. The inner member 3 functions as a pump, which moves backward when pressed by a valve spring (not shown) arranged on the low-pressure chamber RL side to suck fluid into the high-pressure chamber RH, and moves forward toward the high-pressure chamber RH to discharge the high-pressure fluid in the high-pressure chamber RH.

Annular Space

The annular space C1 is a cylindrical space between the plunger 30 and the cylinder 20 as viewed in longitudinal section. The annular space C1 accommodates packing members (sealing members) including the packing ring 6 and the elastic ring 7. The annular space C1 accommodates the bottom ring 4, the back-up ring 5, the packing ring 6, the elastic ring 7, and the spacer ring 8 in this order from the low-pressure chamber RL toward the low-pressure side of the high-pressure chamber RH. This structure prevents the high-pressure fluid from leaking outside.

Bottom Ring

Figure 2:
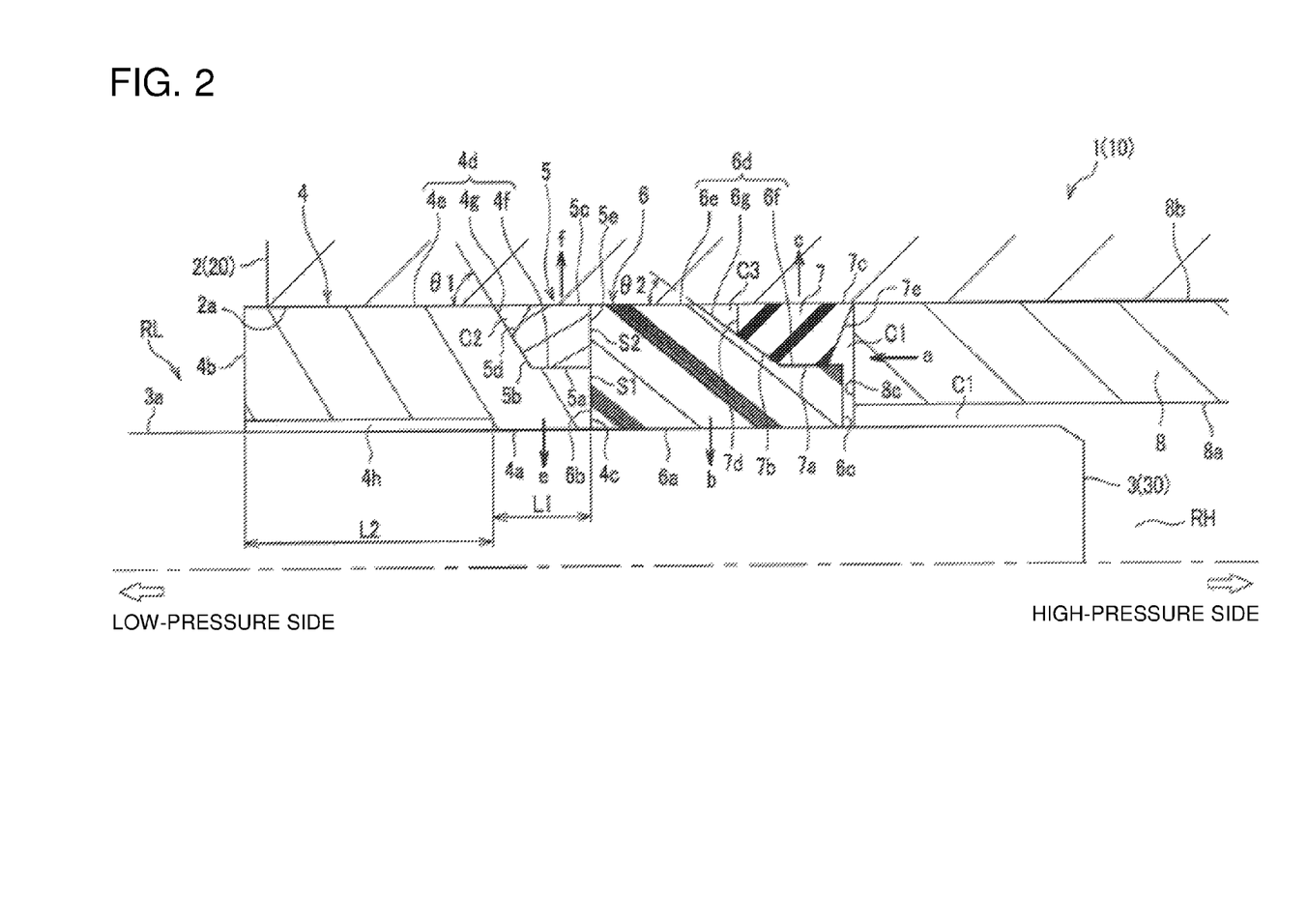
FIG. 2 is an enlarged view of a main part of FIG. 1.

As shown in FIG. 2, the bottom ring 4 is substantially cylindrical. The bottom ring 4 has higher rigidity than the back-up ring 5, the packing ring 6, and the elastic ring 7. The bottom ring 4 includes an inner periphery 4*a* (first inner periphery), a large-diameter outer periphery 4*e* (first large-diameter outer periphery), a small-diameter outer periphery 4*f* (first small-diameter outer periphery), a middle outer periphery 4*g* (first middle outer periphery), and a diameter-expanded inner periphery 4*h*. The inner periphery 4*a* comes in contact with the plunger 30. The large-diameter outer periphery 4*e* connects to a low-pressure-chamber end 4*b* (first low-pressure-chamber end), and comes in contact with the cylinder 20. The small-diameter outer periphery 4*f*, which has a smaller diameter than the large-diameter outer periphery 4*e*, connects to a high-pressure-chamber end 4*c* (first high-pressure-chamber end). The middle outer periphery 4*g* connects to the large-diameter outer periphery 4*e* and the small-diameter outer periphery 4*f*. The diameter-expanded inner periphery 4*h*, which has a larger inner diameter than the inner periphery 4*a*, connects to the low-pressure-chamber end 4*b*.

The bottom ring 4 is fitted in the opening of the cylinder chamber 2*a* of the cylinder 20 on the side of the low-pressure chamber RL. The bottom ring 4 and the back-up ring 5 are formed from a copper alloy to prevent galling. In particular, the bottom ring 4 is formed from, for example, a high-strength copper alloy, which has a higher tensile strength, a higher hardness, and higher durability against galling than the material for the back-up ring 5. For example, the bottom ring 4 has a tensile strength of at least 1000 N/mm$^2$ and a hardness of at least 35 HRC. The bottom ring 4 includes the inner periphery 4*a* with an axial length L1 of 2 to 8 mm inclusive in contact with the plunger 30. The bottom ring 4 includes the small-diameter outer periphery 4*f* and the middle outer periphery 4*g* defining its outer peripheral surface, and thus allows only the large-diameter outer periphery 4*e* on its low-pressure chamber RL side to come in contact with the inner wall of the cylinder chamber 2*a*. The bottom ring 4 includes the diameter-expanded inner periphery 4*h* defining its inner peripheral surface, and thus allows only the inner periphery 4*a* on its high-pressure chamber RH side to come in contact with the outer peripheral surface of the plunger 30.

In the bottom ring 4, the inner periphery 4*a* is nearest the axial line. The inner periphery 4*a* comes in contact with the outer peripheral surface 3*a* of the plunger 30 and serves as a bearing surface for the plunger 30. The inner periphery 4*a* of the bottom ring 4 and an inner periphery 6*a* of the packing ring 6 have the same inner diameter.

The low-pressure-chamber end 4*b* on the low-pressure chamber RL side defines an end face of the substantially cylindrical bottom ring 4, and is annular as viewed from the side. The low-pressure-chamber end 4*b* has its inner peripheral surface connecting to the diameter-expanded inner periphery 4*h*.

As shown in FIG. 2, the high-pressure-chamber end 4*c* defines an end face of the bottom ring 4 on the high-pressure chamber RH side. The high-pressure-chamber end 4*c* extends perpendicular to the axis of the plunger 30 as viewed in longitudinal section, and is annular as viewed from the side. The high-pressure-chamber end 4*c* is in contact with an axially inner portion of a low-pressure-chamber end 6*b* of the packing ring 6. The high-pressure-chamber end 4*c* constitutes 20 to 50% of the dimension of the annular space C1.

The bottom ring 4 includes an outer periphery 4*d*, which defines a cylindrical outer peripheral surface. The outer periphery 4*d* has a step formed by the large-diameter outer periphery 4*e*, the small-diameter outer periphery 4*f*, and the middle outer periphery 4*g*.

In the outer periphery 4d, the large-diameter outer periphery 4e defines a cylindrical outer peripheral surface with the largest outer diameter. The large-diameter outer periphery 4e, which is nearer the low-pressure chamber RL, comes in contact with the inner wall of the cylinder chamber 2a. The large-diameter outer periphery 4e of the bottom ring 4, an outer periphery 5c of the back-up ring 5, a large-diameter outer periphery 6e of the packing ring 6, an outer periphery 7c of the elastic ring 7, and an outer periphery 8b of the spacer ring 8 have substantially the same outer diameter.

In the outer periphery 4d, the small-diameter outer periphery 4f defines a cylindrical outer peripheral surface with the smallest diameter. The small-diameter outer periphery 4f, which is nearer the high-pressure chamber RH, is in contact with the inner wall of an inner periphery 5a of the back-up ring 5. The small-diameter outer periphery 4f and the inner periphery 5a extend parallel to the inner wall surface of the cylinder chamber 2a and to the outer peripheral surface of the plunger 30.

The engagement between the small-diameter outer periphery 4f and the inner periphery 5a that are not beveled allows the bottom ring 4 and the back-up ring 5 to be coaxial with each other. The high-pressure-chamber end 4c of the bottom ring 4 and a high-pressure-chamber end 5e of the back-up ring 5 are both not beveled and extend vertically. The high-pressure-chamber end 4c and the high-pressure-chamber end 5e are in contact with the low-pressure-chamber end 6b of the packing ring 6. This structure, in which the bottom ring 4 and the back-up ring 5 are engaged at right angles and coaxial with each other, supports the plunger 30 without axial misalignment, and prevents leakage of fluid and extends the lifetime of the packing.

As shown in FIG. 2, the middle outer periphery 4g is beveled from the large-diameter outer periphery 4e to the small-diameter outer periphery 4f. To improve sealing with the cylinder 20, the bottom ring 4 may be beveled at an angle θ1 of 30 to 80 degrees, or in some embodiments, 45 to 60 degrees from the high-pressure-chamber end of the large-diameter outer periphery 4e toward the small-diameter outer periphery 4f. The middle outer periphery 4g has an axially inner portion in contact with an engagement portion 5b of the back-up ring 5, and has an outer periphery facing a gap C2.

The gap C2 is a sealed space defined by the middle outer periphery 4g, a gap-defining end face 5d of the back-up ring 5, and the inner wall of the cylinder chamber 2a. The gap C2 is triangular as viewed in longitudinal section. The gap C2 is at an outward position of the middle outer periphery 4g that is inclined as viewed in longitudinal section. This increases the wedge effect of the back-up ring 5.

The diameter-expanded inner periphery 4h defines a cylindrical cutaway space, and extends from substantially the middle of the inner periphery 4a of the bottom ring 4 to the low-pressure-chamber end 4b. The inner diameter of the diameter-expanded inner periphery 4h is slightly larger than the inner diameter of the inner periphery 4a. The diameter-expanded inner periphery 4h is located on the low-pressure chamber RL side of the bottom ring 4. The diameter-expanded inner periphery 4h provides a space for accommodating a part of the packing ring 6 that can extrude toward the low-pressure chamber RL as the plunger 30 slides. The diameter-expanded inner periphery 4h prevents axial misalignment of the plunger 30 and galling, which can be caused by the packing ring 6 being caught by the plunger 30. The axial length of the diameter-expanded inner periphery 4h is substantially the same as the axial length of the large-diameter outer periphery 4e.

Back-Up Ring

As shown in FIG. 2, the back-up ring 5 is a wedge-shaped annular member that is pentagonal as viewed in longitudinal section. The back-up ring 5 is mounted on the small-diameter outer periphery 4f and the middle outer periphery 4g of the bottom ring 4. In other words, the longitudinal section on the high-pressure chamber RH side of the bottom ring 4 is divided into two parts, namely, the small-diameter portion of the bottom ring 4 near the plunger 30, and the back-up ring 5 near the cylinder 20. The back-up ring 5 includes the inner periphery 5a (second inner periphery), the engagement portion 5b (second engagement portion), the outer periphery 5c, the gap-defining end face 5d, and the high-pressure-chamber end 5e (second high-pressure-chamber end). The inner periphery 5a is mounted on the small-diameter outer periphery 4f, and is in contact with the small-diameter outer periphery 4f. The engagement portion 5b is engaged with the middle outer periphery 4g of the bottom ring 4 to restrict axial movement. The outer periphery 5c comes in contact with the cylinder 20. The gap-defining end face 5d faces the gap C2. The high-pressure-chamber end 5e is in contact with the packing ring 6.

The inner periphery 5a defines an axially inner surface of the back-up ring 5 (surface near the plunger 30). The inner periphery 5a is mounted on the small-diameter outer periphery 4f of the bottom ring 4.

The engagement portion 5b is beveled to conform to the beveled edge of the bottom ring 4. The engagement portion 5b increases its diameter from the low-pressure-chamber end of the inner periphery 5a toward the outer periphery. The engagement portion 5b is mounted on an axially inner portion of the middle outer periphery 4g of the bottom ring 4.

The outer periphery 5c defines an outer peripheral surface of the back-up ring 5 (surface near the inner wall of the cylinder chamber 2a). The outer periphery 5c comes in contact with the inner wall of the cylinder chamber 2a.

The gap-defining end face 5d is an end face of an outer periphery of the back-up ring 5 on the low-pressure-chamber side. The gap-defining end face 5d decreases its diameter from the low-pressure-chamber end of the outer periphery 5c toward the outer peripheral end of the engagement portion 5b.

The high-pressure-chamber end 5e defines an end face of the back-up ring 5 on the high-pressure chamber side. The high-pressure-chamber end 5e is in contact with a peripherally outward portion of the low-pressure-chamber end 6b of the packing ring 6. To prevent the packing ring 6 from being misaligned or tilted, the high-pressure-chamber end 5e and the high-pressure-chamber end 4c are flush with each other in the same plane perpendicular to the axial direction of the plunger 30 as viewed in longitudinal section.

Packing Ring

As shown in FIG. 2, the packing ring 6 is a substantially cylindrical member arranged between the spacer ring 8, and the bottom ring 4 and the back-up ring 5. The packing ring 6 includes the low-pressure-chamber end 6b (third low-pressure-chamber end), the inner periphery 6a (third inner periphery), the large-diameter outer periphery 6e (third large-diameter outer periphery), the small-diameter outer periphery 6f (third small-diameter outer periphery), and the middle outer periphery 6g (third middle outer periphery). The low-pressure-chamber end 6b is in contact with the high-pressure-chamber end 5e of the back-up ring 5. The inner periphery 6a comes in contact with the plunger 30. The large-diameter outer periphery 6e connects to the low-pressure-chamber end 6b, and comes in contact with the cylinder 20. The small-diameter outer periphery 6f, which has a smaller diameter than the large-diameter outer periphery 6e, connects to the high-pressure-chamber end 6c (third high-pressure-chamber end). The middle outer periphery 6g connects to the large-diameter outer periphery 6e and the small-diameter outer periphery 6f. The packing ring 6 is formed from, for example, a synthetic resin, such as polymeric polyethylene.

In the packing ring 6, the inner periphery 6a is nearest the axial line. The inner periphery 6a functions as a sealing portion that comes in contact with the outer peripheral surface 3a of the plunger 30.

The low-pressure-chamber end 6b is in contact with the high-pressure-chamber end 5e of the back-up ring 5 and the high-pressure-chamber end 4c of the bottom ring 4. The low-pressure-chamber end 6b extends perpendicular to the axial direction (direction in which the plunger 30 slides), and defines the vertical surface and the coaxial position of the packing ring 6.

The high-pressure-chamber end 6c defines an end face of the packing ring 6 on the high-pressure chamber RH side. The high-pressure-chamber end 6c extends vertical as viewed in longitudinal section, and is annular as viewed from the side. The high-pressure-chamber end 6c is spaced from a low-pressure-chamber end 8c of the spacer ring 8 when no load a is applied on the spacer ring 8 in the direction toward the low-pressure chamber RL. As shown in FIG. 3, when load a is applied on the spacer ring 8 in the direction toward the low-pressure chamber RL, the low-pressure-chamber end 8c of the spacer ring 8 presses the high-pressure-chamber end 6c. This compresses the packing ring 6.

As shown in FIG. 2, the packing ring 6 includes an outer periphery 6d, which defines a cylindrical outer peripheral surface. The outer periphery 6d has a step formed by the large-diameter outer periphery 6e, the small-diameter outer periphery 6f, and the middle outer periphery 6g.

In the outer periphery 6d, the large-diameter outer periphery 6e defines an outer peripheral surface with the largest outer diameter. The large-diameter outer periphery 6e, which is nearer the low-pressure chamber RL, is cylindrical and extends parallel to the outer peripheral surface of the plunger 30. The large-diameter outer periphery 6e comes in contact with the inner wall of the cylinder chamber 2a. The large-diameter outer periphery 6e is arranged between the back-up ring 5 and the elastic ring 7 to space between them and allow no contact.

In the outer periphery 6d, the small-diameter outer periphery 6f defines a cylindrical peripheral surface with a smaller diameter than the large-diameter outer periphery 6e. The small-diameter outer periphery 6f, which is nearer the high-pressure chamber RH, is in contact with the inner wall of an inner periphery 7a of the annular elastic ring 7, and allows no contact with the cylinder 20.

The middle outer periphery 6g defines a beveled side surface connecting the large-diameter outer periphery 6e and the small-diameter outer periphery 6f. The middle outer periphery 6g has an axially inner portion in contact with an engagement portion 7b of the elastic ring 7, and has an outer periphery defining a gap C3.

The gap C3 is a sealed space that is right triangular as viewed in longitudinal section. The gap C3 is defined by the middle outer periphery 6g, a low-pressure-chamber end 7b of the elastic ring 7, and the inner wall of the cylinder chamber 2a. The gap C3 increases the wedge effect of the elastic ring 7.

Elastic Ring

As shown in FIG. 2, the elastic ring 7 is an annular member that is pentagonal as viewed in longitudinal section. The elastic ring 7 includes the inner periphery 7a (fourth inner periphery), the engagement portion 7b (fourth engagement portion), the outer periphery 7c, the low-pressure-chamber end 7d, and a high-pressure-chamber end 7e. The inner periphery 7a is mounted on the small-diameter outer periphery 6f of the packing ring 6, and is in contact with the small-diameter outer periphery 6f. The engagement portion 7b is engaged with the middle outer periphery 6g of the packing ring 6 to restrict axial movement. The outer periphery 7c comes in contact with the cylinder 20. The low-pressure-chamber end 7d faces the gap C3. The high-pressure-chamber end 7e is in contact with the spacer ring 8.

The elastic ring 7 is mounted on the small-diameter outer periphery 6f and the middle outer periphery 6g of the packing ring 6. When pressed by the spacer ring 8, the elastic ring 7 is compressed between the cylinder 20 and the beveled middle outer periphery 6g. As a result, the elastic ring 7 presses the packing ring 6 toward the plunger 30 (direction indicated by arrow b). This places the inner periphery 7a and the engagement portion 7b of the elastic ring 7 in tight contact with the small-diameter outer periphery 6f and the middle outer periphery 6g of the packing ring 6, the outer periphery 7c in tight contact with the inner wall surface of the cylinder chamber 2a, and the inner periphery 6a of the packing ring 6 in tight contact with the outer peripheral surface of the plunger 30. This produces an initial pressure between these members. The elastic ring 7 is formed from, for example, elastic synthetic rubber, such as urethane rubber.

The inner periphery 7a defines an axially inner surface of the elastic ring 7. The inner periphery 7a is mounted on the small-diameter outer periphery 6f of the packing ring 6.

The engagement portion 7b is beveled to conform to the beveled edge of the packing ring 6. The engagement portion 7b increases its diameter from a low-pressure-chamber end of the inner periphery 7a toward the outer periphery. The engagement portion 7b is mounted on an axially inner portion of the middle outer periphery 6g of the packing ring 6.

The outer periphery 7c defines an outer peripheral surface of the elastic ring 7. The outer periphery 7c comes in contact with the inner wall of the cylinder chamber 2a.

The low-pressure-chamber end 7d defines an end face of an outer periphery of the elastic ring 7 on the low-pressure chamber RL side. The low-pressure-chamber end 7d extends vertically from a low-pressure-chamber end of the outer periphery 7c to an outer peripheral end of the engagement portion 7b.

The high-pressure-chamber end 7e defines an end face of the elastic ring 7 on the high-pressure chamber RH side. When no load a is applied on the spacer ring 8 in the direction toward the low-pressure chamber RL, the high-pressure-chamber end 7e is in contact with an outer peripheral end of the low-pressure-chamber end 8c of the spacer ring 8. More specifically, the high-pressure-chamber end 7e is beveled, and decreases its diameter from its end at the outer periphery 7c to its other end at the inner periphery 7a in the axial direction from the high-pressure chamber RH toward the low-pressure chamber RL.

Figure 3:
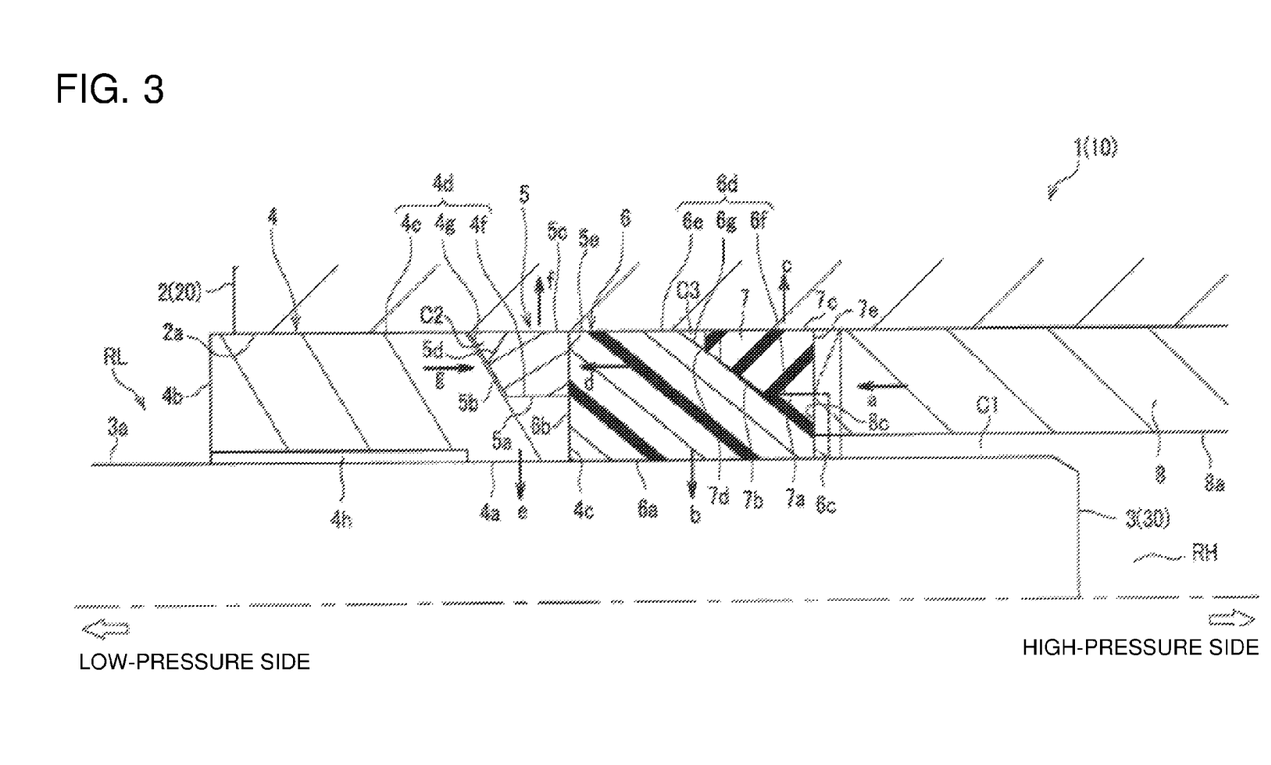
FIG. 3 is an enlarged view of the main part of the ultrahigh-pressure sealing device placed under ultrahigh pressures.

As shown in FIG. 3, when load a is applied on the spacer ring 8 in the direction toward the low-pressure chamber RL, the entire surface of the low-pressure-chamber end 8c of the spacer ring 8 is pressed. This compresses the elastic ring 7.

Spacer Ring

As shown in FIG. 1, the spacer ring 8 is in contact with an outer peripheral end of the high-pressure-chamber end 7e of the elastic ring 7 inside the high-pressure chamber RH. The spacer ring 8 is a cylindrical metal member, which is mounted internally on the inner wall of the cylinder chamber 2a. As shown in FIG. 2, the spacer ring 8 includes an inner periphery 8a, the outer periphery 8b, and the low-pressure-chamber end 8c. The inner periphery 8a receives the plunger 30, which can reciprocate. The outer periphery 8b is mounted internally on the inner wall surface of the cylinder chamber 2a. The low-pressure-chamber end 8c faces the high-pressure-chamber end 6c of the packing ring 6 and the high-pressure-chamber end 7e of the elastic ring 7.

Operation

The operation of the ultrahigh-pressure sealing device 1 according to the present embodiment and the reciprocating pump 10 using the ultrahigh-pressure sealing device 1 will now be described with reference to FIGS. 1 to 3.

As shown in FIG. 2, when the plunger 30 reciprocates between the high-pressure chamber RH and the low-pressure chamber RL over a long period of time, the sliding contact between the plunger 30 and the inner periphery 6a of the packing ring 6 can produce foreign matter including wear debris from the packing ring 6. Such foreign matter is collected inside the diameter-expanded inner periphery 4h of the bottom ring 4, and is then removed out of the diameter-expanded inner periphery 4h toward the low-pressure chamber RL. This prevents the frictional resistance from increasing between the plunger 30 and the packing ring 6, and prevents the sliding performance from being lowered by, for example, galling. This further prevents axial misalignment or oscillation of the plunger 30, as well as fluid leakage. This achieves the stable performance of the sealing device.

On the high-pressure chamber RH side of the packing ring 6, the elastic ring 7 is arranged in contact with the spacer ring 8, and is compressed. This structure transfers the pressure applied from the high-pressure chamber RH to the back-up ring 5 and the bottom ring 4 through the packing ring 6 to place these members in tight contact with one another. This produces an appropriate initial pressure between these sealing members.

As shown in FIG. 3, when a load is applied on the spacer ring 8 from the high-pressure chamber RH toward the low-pressure chamber RL (direction indicated by arrow a), the spacer ring 8 presses the elastic ring 7 and the packing ring 6 toward the low-pressure chamber RL. This compresses the rings. The elastic ring 7 is compressed entirely and moves toward the low-pressure chamber RL. The engagement portion 7b moves along the beveled surface of the middle outer periphery 6g. The outer periphery 7c is pressed against the inner wall surface of the cylinder chamber 2a to achieve sealing. The engagement portion 7b further presses the middle outer periphery 6g of the packing ring 6 in the axial direction (direction indicated by arrow b). This places the inner periphery 6a in tight contact with the plunger 30 to achieve sealing. The packing ring 6 presses the high-pressure-chamber end 5e of the back-up ring 5 and the high-pressure-chamber end 4c of the bottom ring 4.

The low-pressure-chamber end 6b of the packing ring 6 is in contact with the high-pressure-chamber end 5e of the back-up ring 5 and the high-pressure-chamber end 4c of the bottom ring 4. This structure transfers the ultrahigh pressure pressing force applied from the packing ring 6 in the axial direction (direction indicated by arrow d) to both the back-up ring 5 and the bottom ring 4 at the same time. This allows prompt sealing of the back-up ring 5 with the inner wall surface of the cylinder chamber 2a and prompt sealing of the bottom ring 4 with the plunger 30, and improves the sealing performance.

The back-up ring 5 is mounted on the small-diameter outer periphery 4f of the bottom ring 4. This structure allows both the back-up ring 5 and the bottom ring 4 to bear the ultrahigh pressure pressing force applied by the packing ring 6 in the axial direction (direction indicated by arrow d). The back-up ring 5 is mounted on the small-diameter outer periphery 4f of the bottom ring 4. This allows the bottom ring 4 and the back-up ring 5 to be coaxial, and places the large-diameter outer periphery 6e of the packing ring 6 in tight contact with the inner wall surface of the cylinder chamber 2a in an appropriate manner.

The outer periphery 5c with the increasing diameter toward the outer periphery (direction indicated by arrow f) is pressed against and comes in tight contact with the inner wall surface of the cylinder chamber 2a. This improves the sealing of the outer periphery 5c with the inner wall surface of the cylinder chamber 2a. The engagement portion 5b of the wedge-shaped back-up ring 5 further presses the inner periphery 4a of the bottom ring 4, which is axially inward from the back-up ring 5, in the axial direction (direction indicated by arrow e). This places the inner periphery 4a in tight contact with and sealed with the outer peripheral surface of the plunger 30.

The ultrahigh-pressure sealing device 1 with this structure seals the plunger 30 under ultrahigh pressures, and greatly improves sliding performance, sealing performance, durability, and the lifetime of the seal. The ultrahigh-pressure sealing device 1 can seal fluid under ultrahigh pressures of 500 MPa and higher.

As shown in FIG. 3, the high-pressure-chamber end 4c of the bottom ring 4 extends perpendicular to the axial direction. This prevents uneven load from being applied onto the inner periphery 4a, and thus retains the sliding surface between the inner periphery 4a and the plunger 30 in an appropriate manner and prevents the sliding performance from being lowered.

The bottom ring 4 formed from copper carbide can improve sliding on the plunger 30, or specifically improves galling resistance or wear resistance, as compared with the bottom ring 4 formed from stainless steel. The bottom ring 4 has a higher tensile strength and a higher hardness than the back-up ring 5. The bottom ring 4 thus improves the sliding on the plunger 30, or specifically improves the galling resistance or wear resistance.

The high-pressure-chamber end 4c of the bottom ring 4 constitutes 20 to 50% of the dimension of the annular space C1. In this structure, the packing ring 6 applies a higher pressing force onto the back-up ring 5. The back-up ring 5 achieves sealing with the inner wall surface of the cylinder chamber 2a.

The bottom ring 4 is beveled, or has a smaller diameter on the high-pressure chamber RH side, and increases its diameter toward the low-pressure chamber RL. The axial pressing force on the high-pressure side places the outer periphery 5c of the back-up ring 5 in tight contact with the inner wall surface of the cylinder chamber 2a, and improves the sealing with the inner wall surface of the cylinder chamber 2a.

More specifically, the back-up ring 5 has its high-pressure chamber RH side mounted on the small-diameter outer periphery 4f of the bottom ring 4, and has its low-pressure chamber RL side beveled to conform to the beveled edge of the bottom ring 4. As a result, the high-pressure chamber RH side of the back-up ring 5 improves the sealing between the bottom ring 4 and the plunger 30. The beveled low-pressure chamber RL side of the back-up ring 5 improves its sealing with the inner wall surface of the cylinder chamber 2a.

The back-up ring 5 with this dual sealing improves the sealing with the plunger 30 and with the inner wall surface of the cylinder chamber 2a in a more reliable manner.

As shown in FIG. 2, the bottom ring 4 is beveled at an angle θ1 of 30 to 80 degrees with respect to the axial direction. This structure applies a pressing force to press the back-up ring 5 against the inner wall surface of the cylinder chamber 2a in an appropriate manner, and improves the sealing with the inner wall surface of the cylinder chamber 2a. The bottom ring 4 at the bevel angle θ1 of 80 degrees produces at least a predetermined pressing force. The bottom ring 4 at the bevel angle of θ1 of 30 degrees achieves the sealing with the inner wall surface of the cylinder chamber 2a and with the plunger 30.

The bottom ring 4 includes the inner periphery 4a with the axial length L1 of 2 to 8 mm in contact with the plunger 30 to function as the bearing surface. In this case, the diameter-expanded inner periphery 4h has the axial length L2, which is long enough to effectively remove foreign matter, such as wear debris, and also reduces the sliding resistance.

As described above, the ultrahigh-pressure sealing device 1 according to the present embodiment includes the elastic ring 7, the packing ring 6, the back-up ring 5, and the bottom ring 4 arranged in the annular space C1. This improves the sealing performance under ultrahigh pressures, and improves durability. The ultrahigh-pressure sealing device 1 can thus be used in an appropriate manner in the reciprocating pump 10 operable in a range of ultrahigh pressures (500 to 700 MPa).

First Modification

A first modification will now be described with reference to FIG. 4. The components that are the same as described in the above embodiments will be given the same reference numerals, and will not be described.

Figure 4:
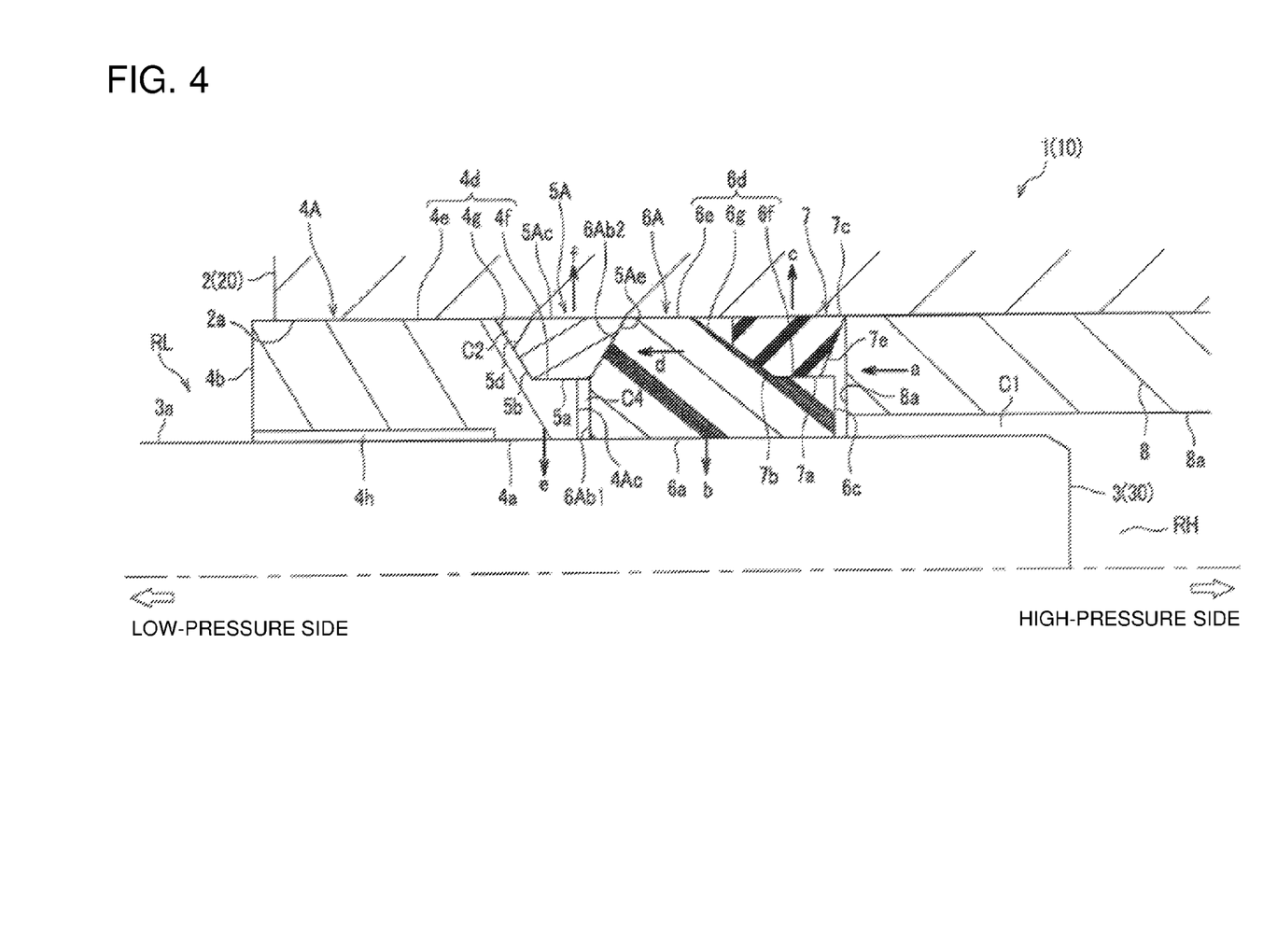
FIG. 4 is a schematic enlarged cross-sectional view of a main part of an ultrahigh-pressure sealing device according to a first modification.

FIG. 4 is a schematic enlarged cross-sectional view of a main part of an ultrahigh-pressure sealing device according to the first modification.

As shown in FIG. 4, a packing ring 6A of the present modification includes a low-pressure-chamber beveled end 6Ab2. A back-up ring 5A also includes a high-pressure-chamber end 5Ae that is beveled. The low-pressure-chamber beveled end 6Ab2 is in contact with the high-pressure-chamber end 5Ae. A gap C4 is defined between the packing ring 6A and a bottom ring 4A. A low-pressure-chamber end 6Ab1 of the packing ring 6A and a high-pressures-side end 4Ac of the bottom ring 4A may be spaced from each other.

The packing ring 6A includes the low-pressure-chamber end 6Ab1 and the low-pressure-chamber beveled end 6Ab2 defining its end face on the low-pressure chamber RL side. The low-pressure-chamber end 6Ab1 is perpendicular to the outer peripheral surface of the plunger 30. The low-pressure-chamber beveled end 6Ab2 is beveled, and increases its diameter from an outer peripheral end of the low-pressure-chamber end 6Ab1 to the inner wall surface of the cylinder chamber 2a toward the high-pressure chamber RH.

The back-up ring 5A includes the high-pressure-chamber end 5Ae, which is beveled to conform to the low-pressure-chamber beveled end 6Ab2. The beveled high-pressure-chamber end 5Ae increases its diameter from a high-pressure-chamber end of the inner periphery 5a to the inner wall surface of the cylinder chamber 2a toward the high-pressure chamber RH. The beveled shape of the high-pressure-chamber end 5Ae increases the area of an outer periphery 5Ac that comes in contact with the inner wall surface of the cylinder chamber 2a.

The low-pressure-chamber beveled end 6Ab2 and the high-pressure-chamber end 5Ae are beveled to conform to each other. When the low-pressure-chamber beveled end 6Ab2 presses the high-pressure-chamber end 5Ae toward the low-pressure chamber RL (direction indicated by arrow d), the back-up ring 5A is easily pressed toward the outer periphery (direction indicated by arrow f). This places the outer periphery 5Ac in tighter contact with the inner wall surface of the cylinder chamber 2a, and improves the sealing with the cylinder chamber 2a.

The high-pressure-chamber end 4Ac of the bottom ring 4A is displaced from the low-pressure-chamber end 6Ab1 toward the low-pressure chamber RL to define the gap C4 between the low-pressure-chamber end 6Ab1 and the high-pressure-chamber end 4Ac.

This structure allows the beveled engagement portion 5b of the back-up ring 5A to press the middle outer periphery 4g of the bottom ring 4A in the axial direction (direction indicated by arrow e) when the low-pressure-chamber beveled end 6Ab2 presses the high-pressure-chamber end 5Ae toward the low-pressure chamber RL (direction indicated by arrow d). This places the inner periphery 4a in tighter contact with the outer peripheral surface of the plunger 30, and maintains the sealing with the plunger 30.

Second Modification

Figure 5:
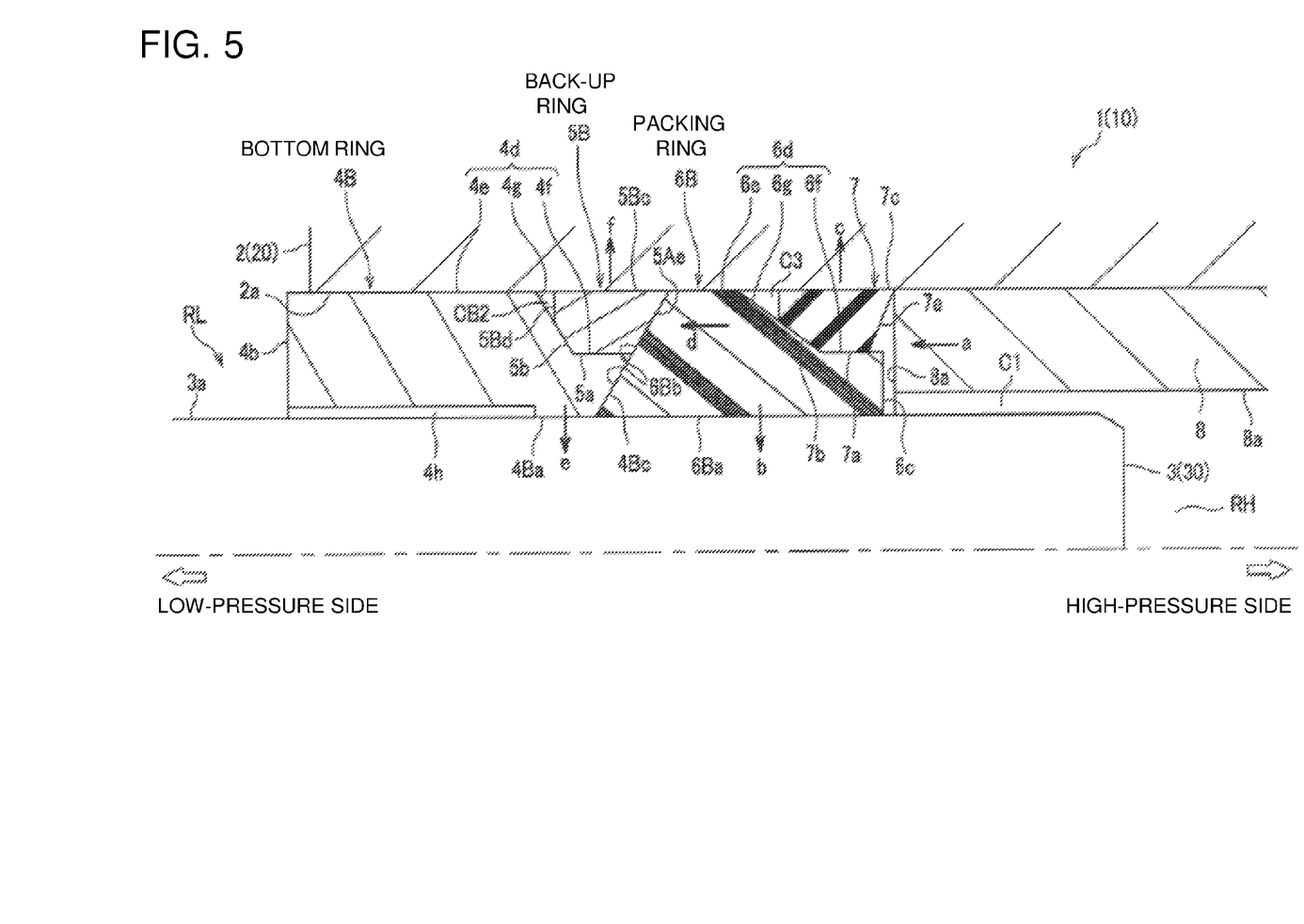
FIG. 5 is a schematic enlarged cross-sectional view of a main part of an ultrahigh-pressure sealing device according to a second modification.

FIG. 5 is a schematic enlarged cross-sectional view of a main part of an ultrahigh-pressure sealing device according to a second modification.

As shown in FIG. 5, a packing ring 6B of the present modification includes a low-pressure-chamber end 6Bb that is beveled. A bottom ring 4B also includes a high-pressure-chamber end 4Bc that is beveled. The low-pressure-chamber end 6Bb and the high-pressure-chamber end 4Bc are in contact with each other. The back-up ring 5B has a gap-defining end face 5Bd, which extends perpendicular to the inner wall surface of the cylinder chamber 2a.

In this case, the low-pressure-chamber end 6Bb of the packing ring 6B increases its diameter from an outer peripheral surface of the plunger 30 to the inner wall surface of the cylinder chamber 2a toward the high-pressure chamber RH.

The high-pressure-chamber end 5Ae of the back-up ring 5B is in contact with the low-pressure-chamber end 6Bb. The high-pressure-chamber end 5Ae and the high-pressure-chamber end 4Bc of the bottom ring 4B correspond to the low-pressure-chamber end 6Bb, and extend from a high-pressure-chamber end of an inner periphery 4Ba toward the inner wall surface of the cylinder chamber 2a. The high-pressure-chamber ends 5Ae and 4Bc, which are flush with each other, together define a beveled end face that increases its diameter.

The beveled shapes of the low-pressure-chamber end 6Bb and the high-pressure-chamber end 4Bc increase the area of an inner periphery 6Ba of the packing ring 6B in contact with the inner wall surface of the cylinder chamber 2a and decrease the area of an inner periphery 4Ba in contact with the inner wall surface of the cylinder chamber 2a.

The low-pressure-chamber end 6Bb, and the high-pressure-chamber end 5Ae and the high-pressure-chamber end 4Bc are beveled to conform to each another. When the low-pressure-chamber end 6Bb presses the high-pressure-chamber end 5Ae and the high-pressure-chamber end 4Bc toward the low-pressure chamber RL (direction indicated by arrow d), the back-up ring 5B is easily pressed toward the outer periphery (direction indicated by arrow f). This places the outer periphery 5Bc in tighter contact with the inner wall surface of the cylinder chamber 2a, and thus improves the sealing with the cylinder chamber 2a.

The back-up ring 5B further includes a gap-defining end face 5Bd, which extends perpendicular to the inner wall surface of the cylinder chamber 2a. The vertical dimension of the gap-defining end face 5Bd increases the area of the outer periphery 5Bc in contact with the inner wall surface of the cylinder chamber 2a, and decreases the longitudinal sectional area of the gap CB2.

As the area of the outer periphery 5Bc that comes in contact with the inner wall surface of the cylinder chamber 2a increases, the area of tight contact between the outer periphery 5Bc and the inner wall surface of the cylinder chamber 2a increases. This improves the sealing with the cylinder chamber 2a.

Third Modification

Figure 6:
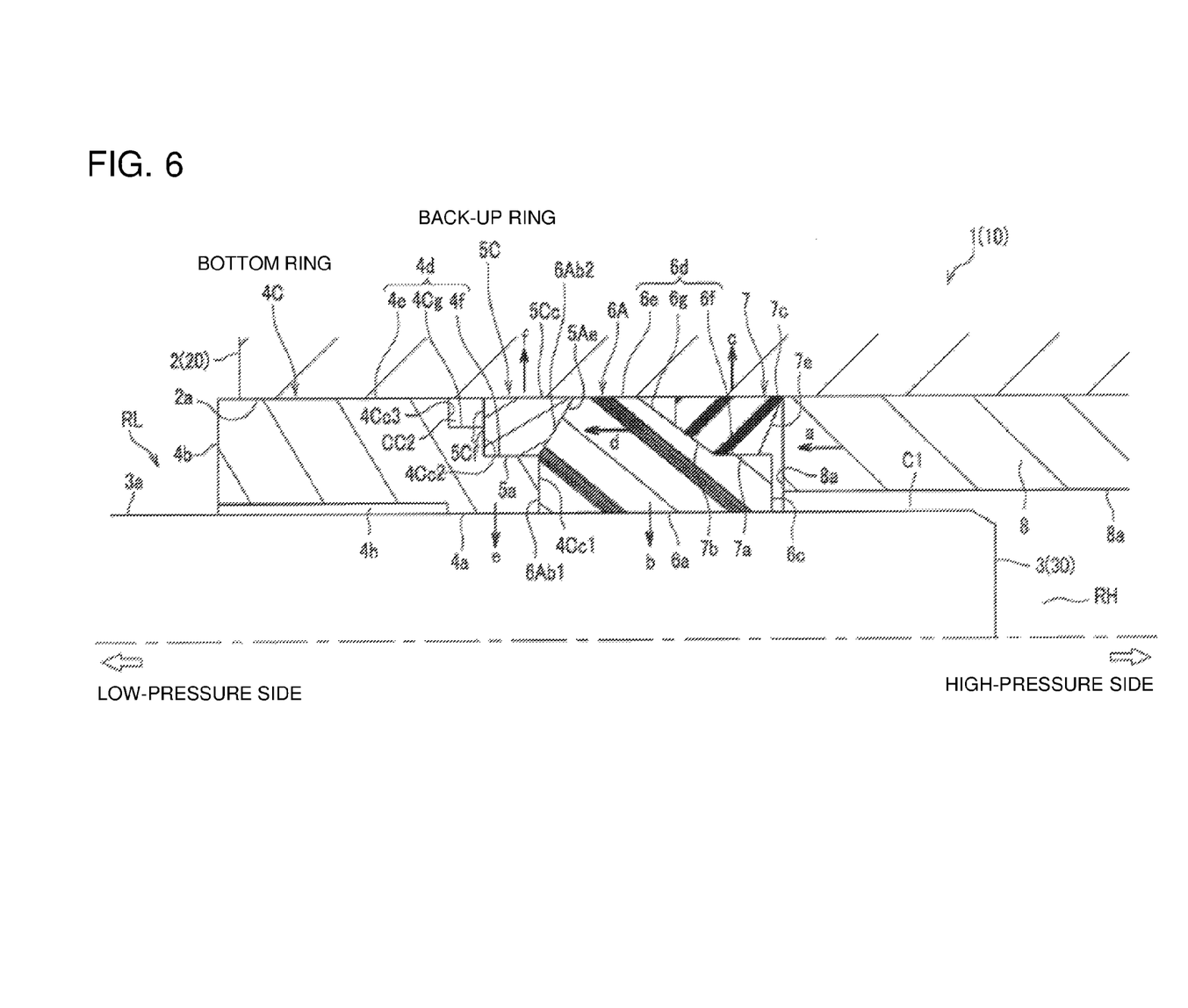
FIG. 6 is a schematic enlarged cross-sectional view of a main part of an ultrahigh-pressure sealing device according to a third modification.

FIG. 6 is a schematic enlarged cross-sectional view of a main part of an ultrahigh-pressure sealing device according to a third modification.

As shown in FIG. 6, a back-up ring 5C of the present modification includes a low-pressure-chamber end 5Cf, which extends perpendicular to the inner wall surface of the cylinder chamber 2a from a low-pressure-chamber end of an inner periphery 5a.

This increases the area of the back-up ring 5C that comes in contact with the inner wall surface of the cylinder chamber 2a, and improves the sealing with the cylinder chamber 2a.

A high-pressure-chamber end 4c of the bottom ring 4C further includes a high-pressure-side inner peripheral end 4Cc1, a high-pressure-side middle end 4Cc2, and a high-pressure-side outer peripheral end 4Cc3. The high-pressure-side inner peripheral end 4Cc1 is in contact with the low-pressure-chamber end 6Ab1 of the packing ring 6A. The high-pressure-side middle end 4Cc2 is in contact with the low-pressures-side end 5Cf of the back-up ring 5C. The high-pressure-side outer peripheral end 4Cc3 defines one of the faces defining a gap CC2, which is rectangular as viewed in longitudinal section.

In this case, the low-pressure-chamber end of the packing ring 6A includes the vertical low-pressure-chamber end 6Ab1 and the low-pressure-chamber beveled end 6Ab2 as in the first modification. The high-pressure-chamber end 5Ae of the back-up ring 5C is also beveled in the same manner as in the first modification. This increases the area of the outer periphery 5Cc that comes in contact with the inner wall surface of the cylinder chamber 2a.

This structure allows the back-up ring 5C to be pressed easily toward the outer periphery (direction indicated by arrow f) when the low-pressure-chamber beveled end 6Ab2 presses the high-pressure-chamber end 5Ae toward the low-pressure chamber RL (direction indicated by arrow d). This places the back-up ring 5C in tight contact with the inner wall surface of the cylinder chamber 2a, and improves the sealing with the cylinder chamber 2a.

Fourth Modification

Figure 7:
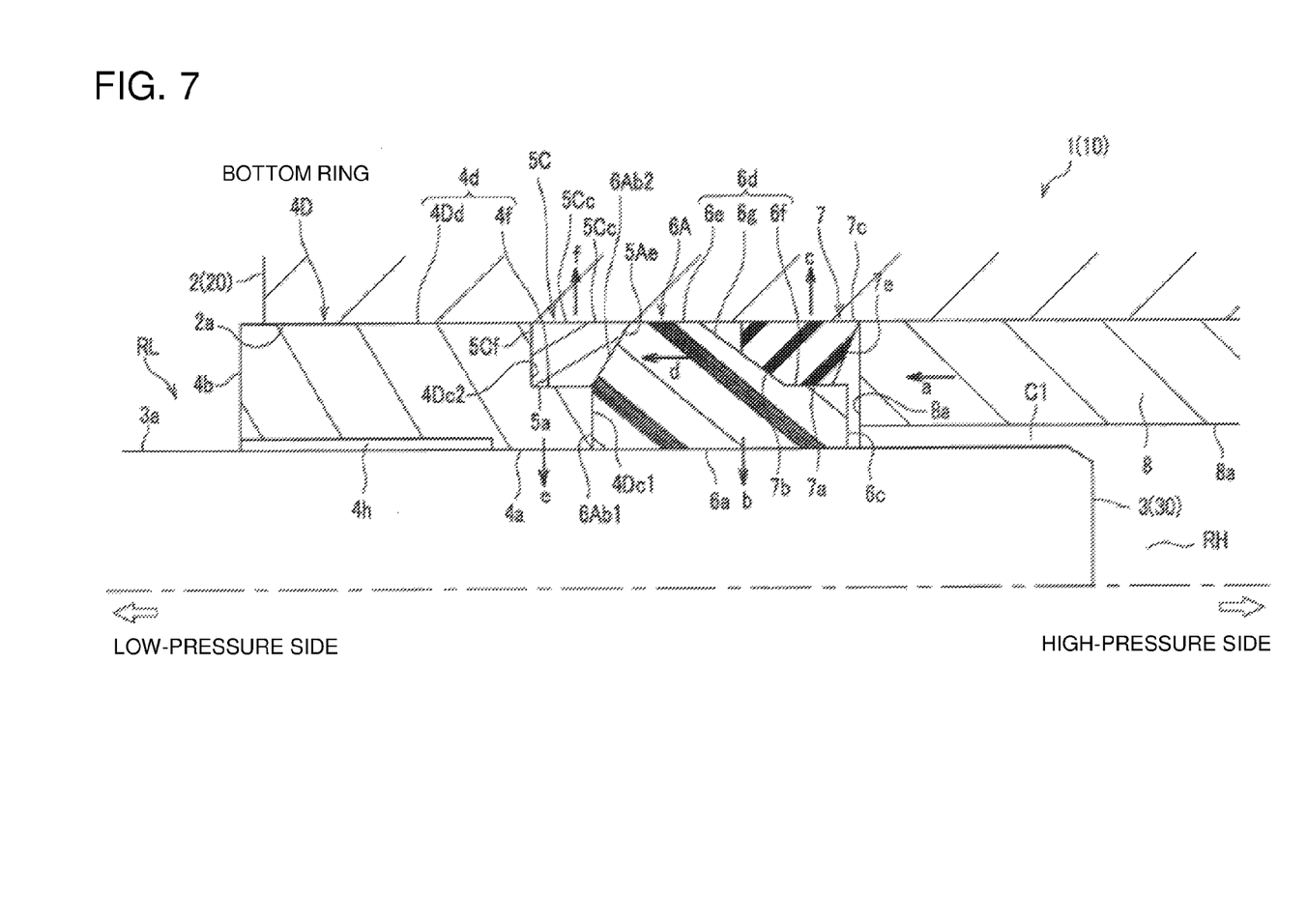
FIG. 7 is a schematic enlarged cross-sectional view of a main part of an ultrahigh-pressure sealing device according to a fourth modification.

FIG. 7 is a schematic enlarged cross-sectional view of a main part of an ultrahigh-pressure sealing device according to a fourth modification.

As shown in FIG. 7, a bottom ring 4D of the present modification includes a high-pressure-chamber end including a high-pressure-side inner peripheral end 4Dc1 and a high-pressure-side middle end 4Dc2. The high-pressure-side inner peripheral end 4Dc1 is in contact with the low-pressure-chamber end 6Ab1 of the packing ring 6A. The high-pressure-side middle end 4Dc2 is in contact with the low-pressure-chamber end 5Cf of the back-up ring 5C.

This structure eliminates the gap CC2 (refer to FIG. 6) between the bottom ring 4D and the back-up ring 5C described in the third modification.

Without the gap CC2 (Refer to FIG. 6), this structure increases the area of the outer periphery 4Dd of the bottom ring 4D that comes in contact with the inner wall surface of the cylinder chamber 2a, and improves the sealing between the bottom ring 4D and the cylinder chamber 2a. The low-pressure-chamber beveled end 6Ab2 of the packing ring 6A further presses the back-up ring 5C toward the outer periphery (direction indicated by arrow f) as in the third modification when the low-pressure-chamber beveled end 6Ab2 presses the high-pressure-chamber end 5Ae toward the low-pressure chamber RL (direction indicated by arrow d). This places the back-up ring 5C in tight contact with the inner wall surface of the cylinder chamber 2a, and improves the sealing with the cylinder chamber 2a.

OTHER MODIFICATIONS

Although the embodiments and the first to the fourth modifications describe the ultrahigh-pressure sealing device 1 used under ultrahigh pressures, the embodiments and modifications are applicable to various parts used under pressures lower than such ultrahigh pressures (500 MPa or higher).

REFERENCE SIGNS LIST 1 ultrahigh-pressure sealing device
2 outer member
3 inner member
4 bottom ring
4a, 5a, 6a, 7a first inner periphery, second inner periphery, third inner periphery, fourth inner periphery
4b, 6b first low-pressure-chamber end, third low-pressure-chamber end
4c, 5e, 6c first high-pressure-chamber end, second high-pressure-chamber end, third high-pressure-chamber end
4d, 5c, 6d, 7c outer periphery
4e, 6e first large-diameter outer periphery, third large-diameter outer periphery
4f, 6f first small-diameter outer periphery, third small-diameter outer periphery
4g, 6g first middle outer periphery, third middle outer periphery
4h diameter-expanded inner periphery back-up ring
5b, 7b second engagement portion, fourth engagement portion
6 packing ring
7 elastic ring
10 reciprocating pump
20 cylinder
30 plunger
C1 annular space
L1 axial length of inner periphery of bottom ring that comes in contact with inner member
RH high-pressure chamber
RL low-pressure chamber S1 area of high-pressure-chamber end of bottom ring
S2 area of high-pressure-chamber end of back-up ring

What is claimed is:

1. An ultrahigh-pressure sealing device mountable in an annular space between an outer member and an inner member to seal the annular space and to separate between a high-pressure chamber and a low-pressure chamber, the sealing device comprising:
    a bottom ring including
        a first low-pressure-chamber end nearer the low-pressure chamber, and a first high-pressure-chamber end nearer the high-pressure chamber,
        a first inner periphery coming in contact with the inner member,
        a first large-diameter outer periphery connecting to the first low-pressure-chamber end, and coming in contact with the outer member,
        a first small-diameter outer periphery having a smaller diameter than the first large-diameter outer periphery, and connecting to the first high-pressure-chamber end,
        a first middle outer periphery connecting the first large-diameter outer periphery and the first small-diameter outer periphery;
    a back-up ring including
        a second high-pressure-chamber end nearer the high-pressure chamber,
        a second inner periphery mounted on the first small-diameter outer periphery and in contact with the first small-diameter outer periphery,
        a second engagement portion engaged with the first middle outer periphery to restrict movement in an axial direction,
        a second outer periphery coming in contact with the outer member;
    a packing ring including
        a third low-pressure-chamber end nearer the low-pressure chamber, and in contact with the second high-pressure-chamber end,
        a third high-pressure-chamber end nearer the high-pressure chamber,
        a third inner periphery coming in contact with the inner member,
        a third large-diameter outer periphery connecting to the third low-pressure-chamber end, and coming in contact with the outer member,
        a third small-diameter outer periphery having a smaller diameter than the third large-diameter outer periphery, and connecting to the third high-pressure-chamber end,
        a third middle outer periphery connecting the third large-diameter outer periphery and the third small-diameter outer periphery; and
    an elastic ring including
        a fourth inner periphery mounted on the third small-diameter outer periphery and in contact with the third small-diameter outer periphery,
        a fourth engagement portion engaged with the third middle outer periphery to restrict movement in the axial direction, and
        a fourth outer periphery coming in contact with the outer member.

2. The ultrahigh-pressure sealing device according to claim 1, wherein
    the first middle outer periphery is beveled from the first large-diameter outer periphery to the first small-diameter outer periphery, and
    the second engagement portion is beveled to conform to the beveled first middle outer periphery.

3. The ultrahigh-pressure sealing device according to claim 1, wherein
    the third low-pressure-chamber end is in contact with the second high-pressure-chamber end and the first high-pressure-chamber end.

4. The ultrahigh-pressure sealing device according to claim 3, wherein
    the second high-pressure-chamber end and the first high-pressure-chamber end are in the same plane perpendicular to the axial direction, and
    the third low-pressure-chamber end is perpendicular to the axial direction.

5. The ultrahigh-pressure sealing device according to claim 1, wherein
    the bottom ring connects to the first low-pressure-chamber end, and includes a diameter-expanded inner periphery having a larger diameter than the first inner periphery.

6. The ultrahigh-pressure sealing device according to claim 1, wherein
    the bottom ring and the back-up ring comprise a copper alloy, and
    the bottom ring has a higher tensile strength and a higher hardness than the back-up ring.

7. The ultrahigh-pressure sealing device according to claim 3, wherein
    the first high-pressure-chamber end constitutes 20 to 50% of a dimension of the annular space.

8. The ultrahigh-pressure sealing device according to claim 2, wherein
    the bottom ring is beveled at an angle of 30 to 80 degrees with respect to the axial direction.

9. The ultrahigh-pressure sealing device according to claim 5, wherein
    the first inner periphery of the bottom ring has an axial length of 2 to 8 mm inclusive.

10. The ultrahigh-pressure sealing device according to claim 2, wherein
    the third low-pressure-chamber end is in contact with the second high-pressure-chamber end and the first high-pressure-chamber end.

11. The ultrahigh-pressure sealing device according to claim 10, wherein
    the second high-pressure-chamber end and the first high-pressure-chamber end are in the same plane perpendicular to the axial direction, and
    the third low-pressure-chamber end is perpendicular to the axial direction.

12. The ultrahigh-pressure sealing device according to claim 2, wherein
    the bottom ring connects to the first low-pressure-chamber end, and includes a diameter-expanded inner periphery having a larger diameter than the first inner periphery.

13. The ultrahigh-pressure sealing device according to claim 3, wherein
    the bottom ring connects to the first low-pressure-chamber end, and includes a diameter-expanded inner periphery having a larger diameter than the first inner periphery.

14. The ultrahigh-pressure sealing device according to claim 10, wherein the bottom ring connects to the first low-pressure-chamber end, and includes a diameter-expanded inner periphery having a larger diameter than the first inner periphery.

15. The ultrahigh-pressure sealing device according to claim 2, wherein
the bottom ring and the back-up ring comprise a copper alloy, and
the bottom ring has a higher tensile strength and a higher hardness than the back-up ring.

16. The ultrahigh-pressure sealing device according to claim 3, wherein
the bottom ring and the back-up ring comprise a copper alloy, and
the bottom ring has a higher tensile strength and a higher hardness than the back-up ring.

17. The ultrahigh-pressure sealing device according to claim 10, wherein
the bottom ring and the back-up ring comprise a copper alloy, and
the bottom ring has a higher tensile strength and a higher hardness than the back-up ring.

18. A reciprocating pump configured to produce a pressure of not less than 500 MPa, the pump comprising:
the ultrahigh-pressure sealing device according to claim 1,
wherein the outer member is a cylinder, and the inner member is a plunger.

* * * * *